US008340727B2

(12) United States Patent
Melzer

(10) Patent No.: US 8,340,727 B2
(45) Date of Patent: Dec. 25, 2012

(54) METHOD AND SYSTEM OF CREATING A VIDEO SEQUENCE

(76) Inventor: Roy S. Melzer, Tel-Aviv (IL)

( * ) Notice: Subject to any disclaimer, the term of this patent is extended or adjusted under 35 U.S.C. 154(b) by 177 days.

(21) Appl. No.: 13/013,844

(22) Filed: Jan. 26, 2011

(65) Prior Publication Data
US 2011/0183711 A1 Jul. 28, 2011

Related U.S. Application Data

(60) Provisional application No. 61/298,226, filed on Jan. 26, 2010.

(51) Int. Cl.
H04B 1/38 (2006.01)

(52) U.S. Cl. .............. 455/566; 455/3.06; 455/412.1; 455/414.1; 455/414.2; 455/418; 455/419; 455/550.1; 455/556.2; 382/115; 382/118; 348/14.01; 348/14.02; 348/231.99

(58) Field of Classification Search .......... 455/3.06, 455/412.1, 412.2, 414.1, 414.2, 418, 419, 455/425, 550.1, 556.2, 566; 382/115, 118; 348/14.01, 14.02, 231.99
See application file for complete search history.

(56) References Cited

U.S. PATENT DOCUMENTS

| 2006/0135139 A1* | 6/2006 | Cheng et al. ............. 455/418 |
| 2009/0147141 A1* | 6/2009 | Lee et al. .................. 348/576 |
| 2009/0175509 A1* | 7/2009 | Gonion et al. ............ 382/118 |
| 2010/0130250 A1* | 5/2010 | Choi ......................... 455/556.1 |
| 2010/0150407 A1* | 6/2010 | Cheswick ................. 382/118 |
| 2010/0216441 A1* | 8/2010 | Larsson et al. ........... 455/415 |
| 2010/0257239 A1* | 10/2010 | Roberts ..................... 709/204 |
| 2010/0325218 A1* | 12/2010 | Castro et al. ............. 709/206 |
| 2011/0167357 A1* | 7/2011 | Benjamin et al. ........ 715/753 |

* cited by examiner

Primary Examiner — Olumide T Ajibade Akonai

(57) ABSTRACT

A method of creating a video sequence. The method comprises setting at least one repetitive reminder in a schedule managed by a handheld device having an image sensor, alarming a user according to the at least one repetitive reminder, capturing a sequence of images using the image sensor, automatically identifying a facial image depicting a face in a preset area in the sequence of images, automatically selecting the facial image, in response to the identification, and adding the facial image to a facial video sequence.

20 Claims, 5 Drawing Sheets

METHOD AND SYSTEM OF CREATING A VIDEO SEQUENCE

RELATED APPLICATION

This application claims the benefit of priority under 35 USC 119(e) of U.S. Provisional Patent Application No. 61/298,226 filed Jan. 26, 2010, the contents of which are incorporated herein by reference in their entirety.

FIELD AND BACKGROUND OF THE INVENTION

The present invention, in some embodiments thereof, relates to method and system of creating a sequence of images and, more particularly, but not exclusively, to a method and system of creating a facial video sequence.

During the last years, blogging have become a wide phenomena. Many people and companies manage a website, a microsite or the like wherein they upload regular entries of commentary, descriptions of events, or other material such as graphics or video. The entries are commonly displayed in reverse-chronological order.

Methods and system have been developed for creating blogs with textual or visual content. For example, patent publication number (WO/2004/102855), titled "Content Publishing Over Mobile Networks" discloses a system for using mobile phones to generate instant messages and permanent text publishing, images and audio files as mobile web logs (hereinafter, "mBlogs") over mobile networks. The system allows a user to generate and publish text, and attach image files and audio files with a time and location of an event as a non-revocable and integral part of the published content. Users are allowed to view and interact with the published content with mobile phones over mobile networks. The system allows for sorting of content by category and by indexing the material by the operator of a mobile network, and allows the users of mBlogs to search for content by category as well as by indexing. Furthermore, the system allows users to subscribe to mBlogs as multimedia messages for viewing on mobile phones over mobile networks.

Another example is described in U.S. Patent Publication number 2008/0177752, filed on Jan. 22, 2008 that describes a method for real-time video blogging, including creating and entering comments in real-time by a plurality of terminals accessing a blog; uploading the created and entered comments to a server providing the blog by the terminals; converting the uploaded comments to separate descriptor files and storing the descriptor files in a blog file by the server; and downloading and playing the blog file containing the descriptor files from the server by the terminals.

SUMMARY OF THE INVENTION

According to some embodiments of the present invention there is provided a method of creating a video sequence. The method comprises setting at least one repetitive reminder in a schedule managed by a handheld device having an image sensor, alarming a user according to the at least one repetitive reminder, capturing a sequence of images using the image sensor, automatically identifying a facial image depicting a face in a preset area in the sequence of images, automatically selecting the facial image, in response to the identification, and adding the facial image to a facial video sequence.

Optionally, the automatically identifying is performed using a reference facial area.

More optionally, the method further comprises capturing an initial facial image and calibrating the reference facial area according to the location of an initial face depicted in the initial image.

Optionally, the automatically identifying comprises automatically identifying a facial image depicting a face having a preset facial expression.

More optionally, the method further comprises capturing an initial facial image and calibrating the preset facial expression according to the facial expression of an initial face depicted in the initial image.

More optionally, the reference facial area is adjusted according to a location of the face in at least one previously captured facial image in the facial video sequence.

More optionally, the preset facial expression is adjusted according to a facial expression of the face in at least one previously captured facial image in the facial video sequence.

Optionally, the automatically identifying comprises automatically initiating the capturing in response to the alarming.

Optionally, the method further comprises automatically adding a tag comprising content according to at least one schedule record of the schedule to the facial image.

Optionally, the method further comprises automatically adding a tag describing a geographic location of the handheld device during the capturing to the facial image.

Optionally, the method further comprises automatically adding a note created using the handheld device to the facial image.

Optionally, the adding comprises forwarding the facial image to a remote storage which hosts the facial video sequence and connected to a network.

Optionally, the method further comprises presenting the facial video sequence to a plurality of users via the network.

According to some embodiments of the present invention there is provided a handheld device of creating a facial video sequence. The handheld comprises an image sensor which captures a sequence of images, a scheduling module which sets at least one repetitive reminder in a schedule, and a facial recognition module which activates the image sensor in response to the at least one repetitive reminder, automatically identifies a facial image depicting a face in a preset area in the sequence of images and automatically adds the captured facial image to a facial video sequence.

Optionally, the handheld device further comprises a presentation unit which alarms a user according to the at least one repetitive reminder.

Optionally, the handheld device further comprises an instruction module for computing at least one instruction for maneuvering the handheld device so capture the facial image and presenting the at least one instruction on a screen of the handheld device.

Optionally, the handheld device is a cellular phone.

Optionally, the handheld device further comprises a location module which detects a location of the handheld and adds the location to the facial image.

Optionally, the handheld device further comprises a communication module for forwarding the facial image to a remote storage storing the facial video sequence.

Optionally, the handheld device further comprises a memory of storing the facial image.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
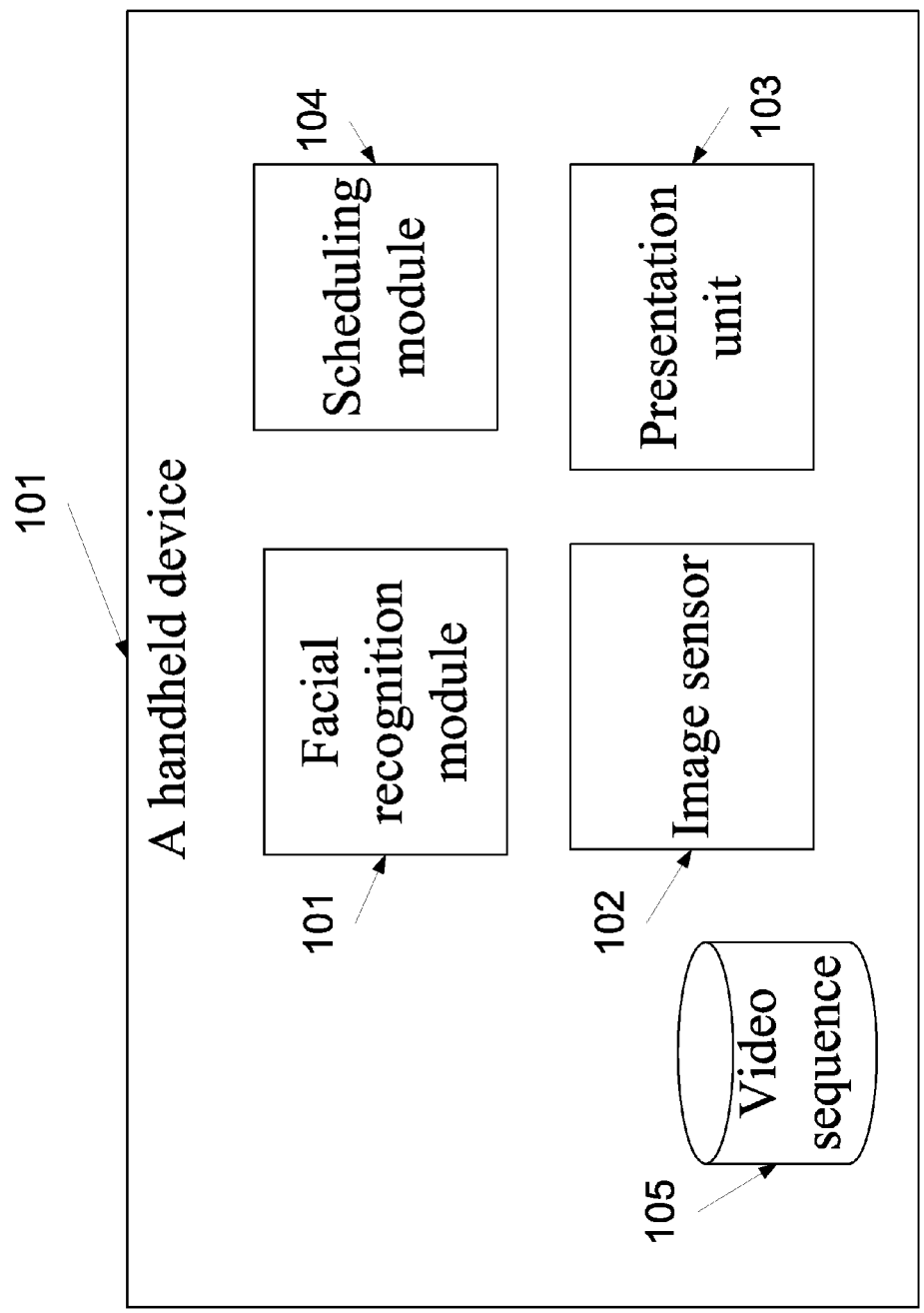
FIG. 1 is schematic illustration of a handheld device of creating a video sequence of facial images which have been captured in different and separate events, according to some embodiments of the present invention.

The present invention, in some embodiments thereof, relates to method and system of creating a sequence of images and, more particularly, but not exclusively, to a method and system of creating a facial video sequence.

According to some embodiments of the present invention there is provided a handheld device, such as a cellular phone, and a method for creating a video sequence that depicts change, such as facial changes of a target object, such as a person, over a period. The device includes a scheduling module that reminds a user to take a picture of the target object. The device further includes a facial recognition module that assures that the captured images depict the face of the target object in a common facial area and/or that the captured images depict the face of the target object in common expression.

Optionally, the device includes an instruction module for instructing the user during the image capturing.

Optionally, the device includes a GPS module that allows adding a tag documenting the location of the user during the image capturing.

According to some embodiments of the present invention there is provided a method of creating a video sequence which is based on one or more repetitive reminders which are set in a schedule managed by a handheld device having an image sensor. This allows alarming a user according to the repetitive reminders and capturing a sequence of images using the image sensor, optionally automatically in response to the repetitive reminders. A facial image depicting a face in a preset area in the sequence of images is automatically identified, selected, and added to a facial video sequence which is located in the memory of the handheld device and/or on a remote server, such as a web server.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is schematic illustration of a handheld device 100 of creating a facial sequence of images which have been captured in different and separate events, in which the face of a target object is located in a common area in the frame, according to some embodiments of the present invention. The period between every two separate events, may be half an hour, an hour, 12 hours, a day a year, and any intermediate interval. The device 100 is optionally a cellular phone, for example Iphone™, a laptop, a music player, a netbook, and a tablet. The device 100 includes a scheduling module 104 which sets one or more repetitive reminders in a schedule, such as an Outlook™ calendar, an Iphone™ or an Ipod™ calendar, and the like. As used herein, a repetitive reminder may be a reminder that is activated any number of times a day, for example once or twice, once in every predefined number of hours, before, after, and/or during an event, such as an event scheduled in the schedule and the like. The reminders may be set automatically, optionally daily, weekly, or monthly and/or during a calibration process, for example as described below.

Figure 2:
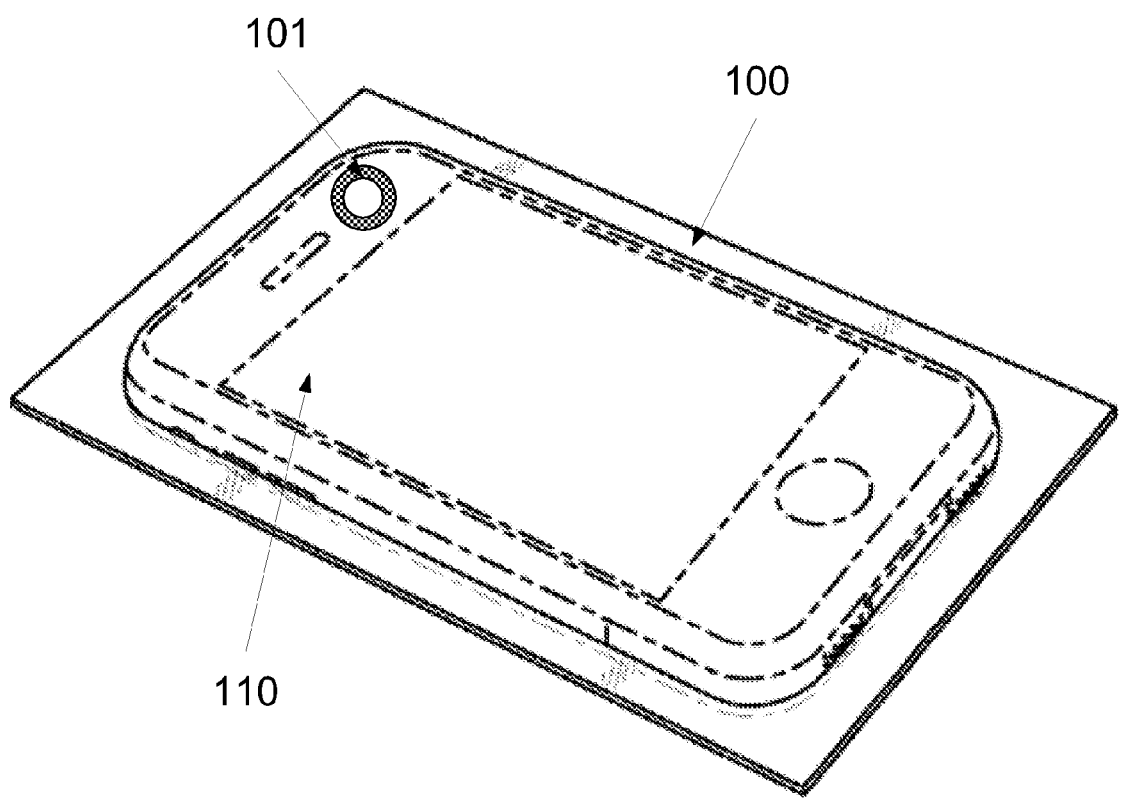
FIG. 2 is an exemplary handheld device, a cellular phone, according to some embodiments of the present invention.

The handheld device 100 further comprises an image sensor 102, such as a CMOS based and/or a CCD based image sensor, that is configured for capturing a facial image of the user. The image sensor 102 may be placed with his face toward the face of the handheld device 100, for example as shown in FIG. 2, or with his face toward the opposing side, the back of the housing of the handheld device 100. The image sensor is optionally integrated in the handheld device, for example an integrated camera of a cellular phone, as shown at FIG. 2 or a laptop.

The handheld device 100 further includes one or more presentation units 103, referred to herein as a presentation unit 103, which alarms the user of the handheld device 100 according to the reminders. The presentation according 103 may be a display, such as a screen, for example a touch screen, as shown at 110, a tactile element, such as vibrator, and/or a speaker. Respectively, the alarms may be visual, tactile, and/or sonic. The presentation according 103 are optionally integrated in the handheld device, for example a speaker, a display, and/or the tactile element of a cellular phone or a laptop.

The handheld device 100 further includes a facial recognition module 101 which analyses the images captured by the image sensor 102 and automatically identifies a facial image that depicts a face, optionally human, in a predefined area of its frame. The facial recognition module 101 adds the facial image to a facial video sequence which locally hosted on the memory of the device, as shown at 105 and/or to a facial video sequence which is stored on a remote storage device, for example as described below.

Figure 3:
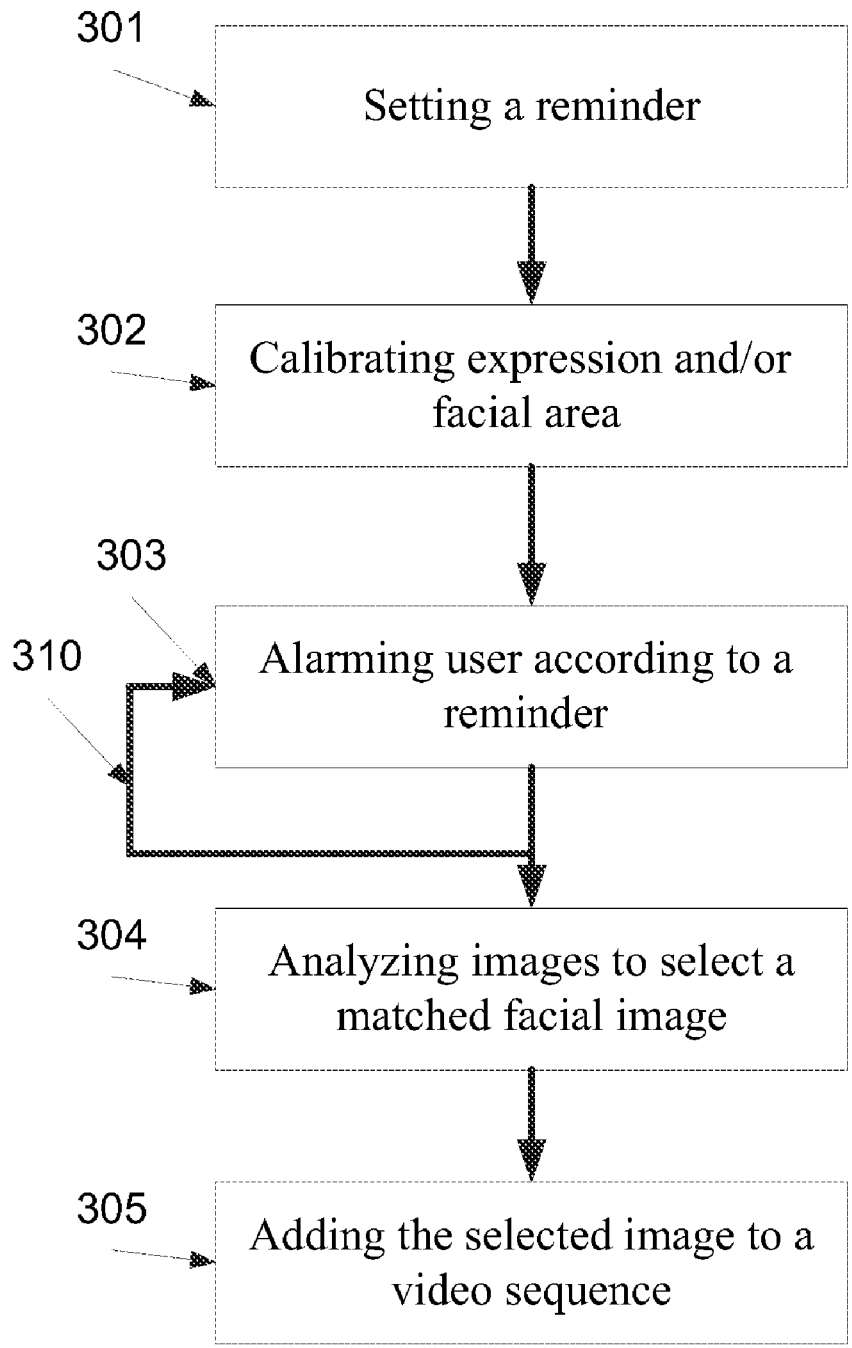
FIG. 3 is a flowchart of a method of generating a sequence of images which have been captured in different and separate events, in which the face of user are located in a common area in the frame, according to some embodiments of the present invention.

Reference is now also made to FIG. 3, which is a flowchart of a method 300 of generating a sequence of images which have been captured in different and separate events, in which the face of user are located in a common area in the frame, according to some embodiments of the present invention.

First, as shown at 301, one or more repetitive reminders are set in the schedule of the handheld device 100. Optionally a graphical user interface (GUI) is presented to the user, allowing her to select or mark a repetitive reminder, for example every day in 15:30 PM, every day in 06:30 AM, every day in 09:00 AM and in 15:30 PM and the like. Optionally, the repetitive reminder is added to the calendar of the handheld device 100.

Optionally, the captured image is filtered to remove noise, for example salt and pepper noise. The filtering may be performed using filters, for example n*m order filters. Minimum filters, Maximum filters or Median filters.

Now, as shown at 302, the process is calibrated. During the calibration process a reference facial area is set. Optionally, the user uses the image sensor 102 for capturing a facial image of an object, optionally an object that has a face, for example a certain person and/or a certain animal, such as a cat or a dog, which may be referred to herein as a target object.

Figure 4:
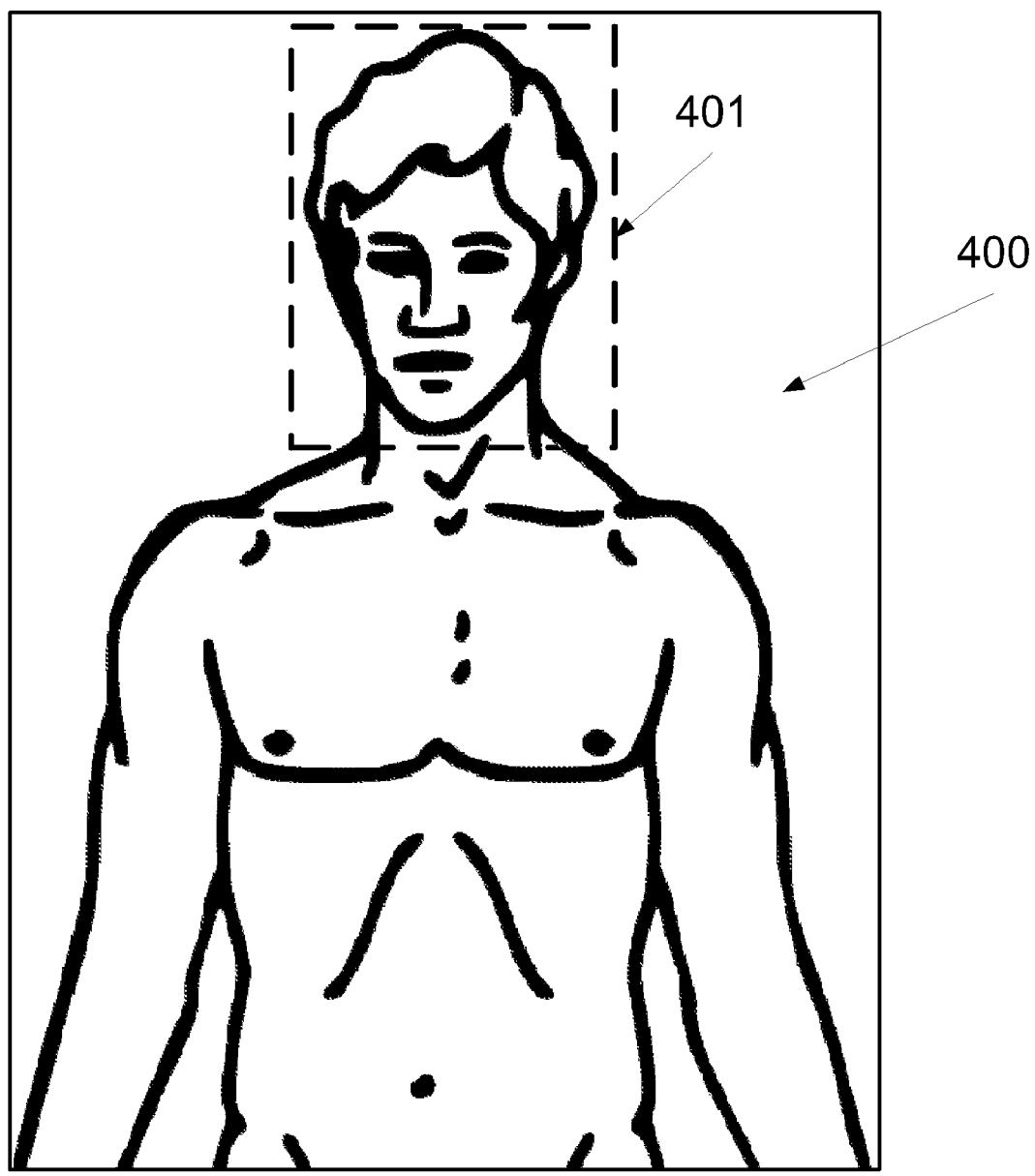
FIG. 4 is a schematic illustration of an exemplary image having a facial area marked, according to some embodiments of the present invention.

Now, a reference area in which the face of the target object is found, for example as shown by numeral 401 of FIG. 4.

Optionally, the handheld device 100 has a face detection module that detects the reference face area 401 within the boundaries of the captured image 400. The reference face area 401 delimits the face that is depicted in the captured image 400. Optionally, in order to support the delimitation of the face area, the contrast between the face area and the rest of the image is sharpened. The delimitation of the face area may be based on color information of the color pixels of the captured image. Optionally, the HSV color space may be used for identifying an area of the frame of the captured image where the face is found, for example when the face is a human face. The image sensor 102 which is used to capture the image may output the captured image in a variety of color coordinates, such as Red-Blue-Green (RGB) color coordinates or other color space coordinates. Optionally, the color space coordinates of the captured image is converted to HSV color coordinates. As commonly known, the hue distribution of human skin is in a certain range. Such a range thus provides a common hue level that can be used to identify those color pixels that represent human skin. The common hue level may thus be used to detect a cluster of color pixels that represents the skin of the face in the captured image. Optionally, the saturation level of each pixel may be used in addition to the hue level in order to augment the determination of whether the pixel represents human skin or not. Optionally, the used hue level is in a range determined in relation to a shifted Hue space. The location of the area in which the face is found is stored as a facial area, for example as coordinates. Optionally, the facial area is detected as described in Ishii et al., 'Face Detection Based on Skin Color Information in Visual Scenes by Neural Networks', Oct. 12-15, 1999, 1999 IEEE International Conference on Systems, Man, and Cybernetics, vol. 5, pp. 350-355, which is incorporated herein by reference.

Additionally or alternatively, the expression of the target object is identified and stored as a reference expression. Optionally, the reference expression includes positional, structural, and angular data pertaining to facial features, such as the lips, the eyebrows, the nostrils, and the like. The reference expression may be indicative of the actual facial expression of the target object, for example neutral face expression, smile, anger, disguised, shame, sadness, and the like. Optionally, the expression is detected and represented in known methods for example as described in Ioannou, Spiros et. Al, robust feature detection for facial expression recognition, International Journal of Image and Video Processing, Jan. 1, 2007; Wu et al., 'Fast Rotation Invariant Multi-View Face Detection Based on Real Adaboost', May 17-19, 2004, Proceedings of the Sixth IEEE International Conference on Automatic Face and Gesture Recognition, pp. 79-84; Xiao et al., 'Robust Multipose Face Detection in Images', January 2004, IEEE Transactions on Circuits and Systems for Video Technology, vol. 14, No. 1, pp. 31-41; Schneiderman, Henry et al., "A Statistical Method for 3D Object Detection Applied to Faces and Cars, "Robotics Institute, Carnegie Mellon University, Pittsburgh, Pa.; and Stan Z. Li, Long Zhu, Zhenqiu Zhang, Andrew Blake, Hongjiang Zhang and Harry Shum, "Statistical Learning of Multi-View Face Detection," A. Heyden et al. (Eds.):ECCV 2002, LNCS 2353, pp. 67-81, Springer-Verlag Berlin Heidelberg 2002, which are incorporated herein by reference.

Now, as shown at 303, the user of the handheld device 100 is alarmed according to the repetitive reminders which are set in the schedule. The alarming is performed by the presentation unit 103, for example as described above. The alarming reminder the user that she should take an image of the target object, for example of herself. As described above, the alarming is performed, according to the reminders, every number of hours, every day in a certain hour, a number of times day in certain hours and the like.

Optionally, the facial recognition module 101 receives an indication about the repetitive reminder and automatically instructs the initiation of an image capturing process. In such a manner images are captured and analyzed, as further described below, without any additional act from the user.

Optionally, the reminder triggers the presentation of a GUI on the screen of the handheld device. The GUI reminds the user that a facial image should be captured and/or asks the user whether to initiate a facial image selection process and/or to postpone the facial image selection process and to provide him another reminder, for example within 5, 10, 1, 60 minutes or more, as shown at 310, and/or to dismiss it.

Now, as shown at 304, the image capturing process initiates and images which are captured by the image sensor 102 are analyzed to select an image that depicts a face in the face area, optionally with an expression which is similar to the reference expression.

Figure 5:
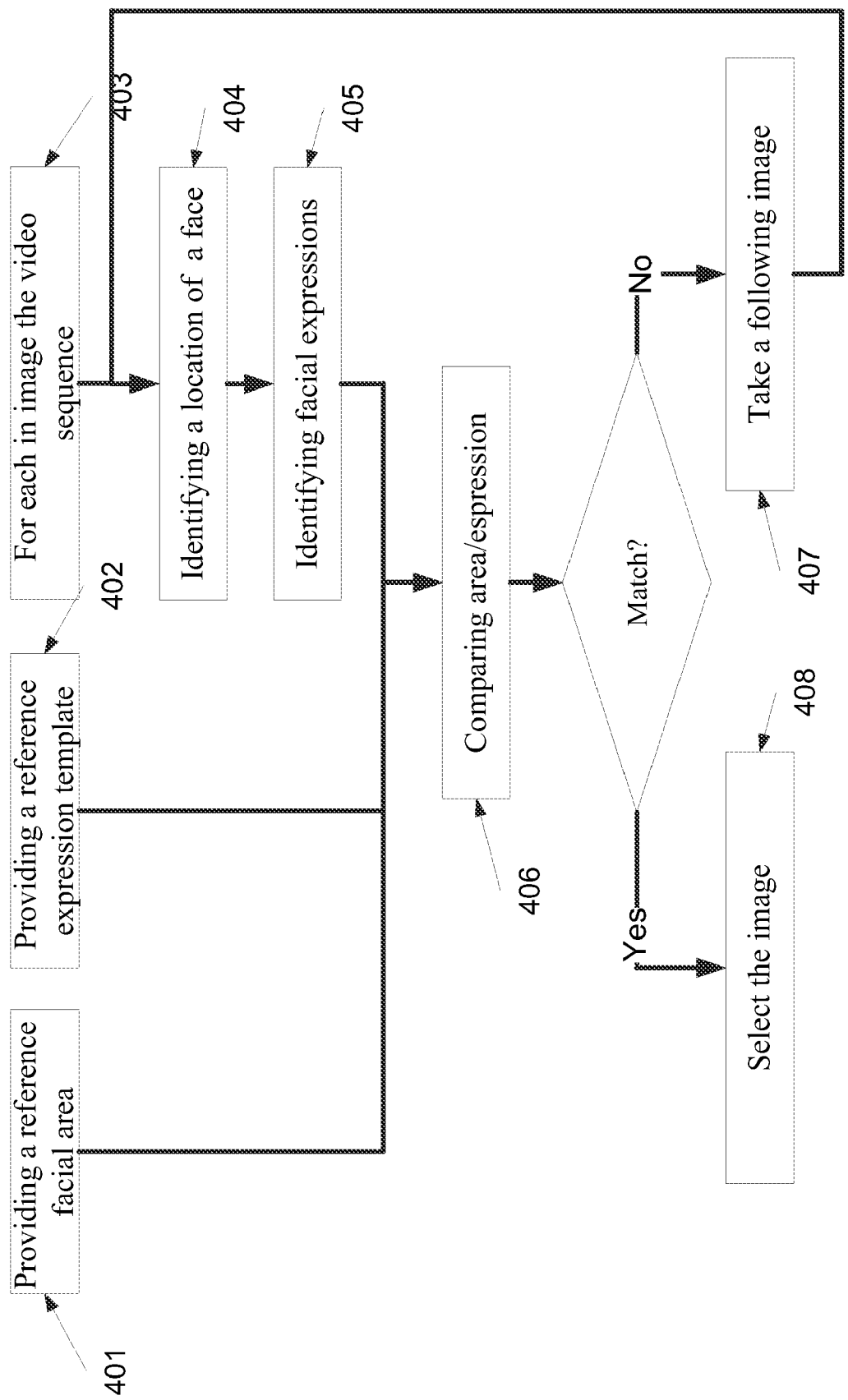
FIG. 5 is a flowchart of an exemplary facial image selection process, according to some embodiments of the present invention.

Reference is now also made, to FIG. 5 which is a flowchart of an exemplary facial image selection process, according to some embodiments of the present invention.

First, as shown at 401 and 402, the reference facial area and optionally the reference facial expression are received. Optionally, the reference facial area is received as coordinates. Optionally the reference facial expression is set by a set of positional, structural, and angular data pertaining to facial features.

Now, as shown at 403, some or all of the images captured by the image sensor 102 are analyzed to whether they depict a face in a face area which is matching to the reference face area (for example having the same coordinates and optionally size) and optionally whether the face has a facial expression as defined at the reference expression.

As shown at 404 and 405, the location of the face in each one of the analyzed images, and optionally the expression on that face, are identified in a similar manner to the identification of the reference face area and the reference expression, which are described above with regard to the calibration process.

Then, as shown at 406, the location and optionally the facial expression are compared with the reference face area and the reference expression. If the comparison indicates a match of more than a certain level, for example more than 50%, 70%, 90%, 99% or any intermediate or higher value, the facial image, which may be referred to herein as a matched image, is selected, as shown at 408. Else, as shown at 407, a following facial image is analyzed as shown at 404-406.

It should be noted that the object target may be the user himself and/or any person or animal she selects, for example her child, her friends and the like. As images are captured by the image sensor 102 as long as no image is selected the user has time to manipulate the handled device 100, which is optionally a cellular phone. Optionally, the manipulation is performed by replacing the handled device 100 in front of the target object face, by changing the zoom of the image sensor 102 and the like. Optionally the zoom of the image sensor 102 is fixed according to the zoom which has been used for capturing an image depicting the reference face area.

According to some embodiments of the present invention, the device 100 further comprises an instructing module designed to instruct the user during the facial image selection process. Optionally, the instructing module aids the user to align and/or otherwise maneuver the handheld device 100 so as to acquire the facial image which is needed in order to assemble the video sequence. For example, the instructing module presents a motion direction indicator and/or a frame alignment indication which are visible to the user, for example on the screen of the handheld device 100. Optionally, the motion direction indicator and/or the frame alignment indication are calculated with respect to the local motion of the face and/or the global motion of the captured images. Optionally, the instructing module receives the coordinates of the reference facial area and the coordinates of the facial area in the captured image and calculates a motion vector between them. The motion vector is presented to the user, indicating how the handheld device 100 should be maneuvered. The instructing module may also estimate size differences between the reference facial area and the facial area in the captured image. In such an embodiment, the instructing module may present an indication whether the user should zoom in, zoom out, tilt in, and/or tilt out.

Reference is now made, once again, to FIG. 3. As shown at 305, the image is selected during a facial image selection process depicted in 304, is added to a facial video sequence. The facial video sequence may be stored in the memory of the handheld device 100 and/or in a remote server, such as a web server. In use, the selected image is added locally to the memory of the device, which may be a cellular device and/or sent, for example using a multimedia messaging service (MMS) or a TCP/IP service to the remote server. The forwarding and/or storage of the selected image may be performed automatically and/or after the user confirmation.

In such embodiments, the video sequence may be accessed by other users via other client terminals, for example mobile devices, laptops, personal computers and the like. The access may be performed via a network such as a cellular network, a computer network, a wireless IP-based network, a WLAN, or the combination thereof.

For example, the video sequence may be published in a website of the user, such as a social network page. In such a manner, other users may see a sequence that depicts changes in the face of the user during a period of few hours, days, weeks, months, and/or years.

According to some embodiments of the present invention, additional content is added to the image before the adding thereof to the video sequence. The additional content may be information from the schedule, for example the activities of the user during that day, hour, and/or portion of the day, the date and hour of the image capturing event, a note added by the user, for example using a GUI which is presented on the screen of the handheld device 100, geographic location of the user, for example taken by a GPS module or any other navigation or tracking system which are integrated and/or connected to the handheld device 100.

As described above, image is selected for addition to the video sequence according to a match with the reference facial area and the reference expression. Optionally, the reference facial area and the reference expression are adjusted according to images which are documented in the video sequence, for example one or more previously taken images. For example, the coordinates of the reference facial area may be shifted toward the coordinates of the facial area in one or more of the previously captured images and/or the size and/or area of the facial area may increase or decrease according to an increase or a decrease in one or more of the previously captured images. In another example, the reference expression is changed according to changes to facial features which are depicted in one or more of the previously captured images. In such a manner, a gradual change in the expression of the target object and/or in his facial features do not prevent from selecting an image which is suitable for creating a facial video sequence, for example as described above.

Optionally, the differences between images in the sequence video may be quantified and presented to the user, for example as percentage. In such a manner, the user receives an indication of changes over time, for example in a graph.

The device 100 may be used for creating video sequences which depicts a number of different target objects. In such an embodiment, the process depicted in FIG. 3 may be repeated for each target object.

It is expected that during the life of a patent maturing from this application many relevant methods and systems will be developed and the scope of the term an image, a module, a memory, a server, a video sequence and an image sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of."

The phrase "consisting essentially of" means that the composition or method may include additional ingredients and/or steps, but only if the additional ingredients and/or steps do not materially alter the basic and novel characteristics of the claimed composition or method.

As used herein, the singular form "a", an and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of creating a video sequence, comprising: setting at least one repetitive reminder in a schedule managed by a handheld device having an image sensor; alarming a user according to said at least one repetitive reminder; in response said at least one repetitive reminder, capturing a sequence of images using said image sensor; automatically identifying a facial image depicting a face in a preset area in said sequence of images; automatically selecting said facial image, in response to said identification; and adding said facial image to a facial video sequence.

2. The method of claim 1, wherein said automatically identifying is performed using a reference facial area.

3. The method of claim 2, further comprising capturing an initial facial image and calibrating said reference facial area according to the location of an initial face depicted in said initial image.

4. The method of claim 1, wherein said automatically identifying comprises automatically identifying a facial image depicting a face having a preset facial expression.

5. The method of claim 4, further comprising capturing an initial facial image and calibrating said preset facial expression according to the facial expression of an initial face depicted in said initial image.

6. The method of claim 2, wherein said reference facial area is adjusted according to a location of said face in at least one previously captured facial image in said facial video sequence.

7. The method of claim 4, wherein said preset facial expression is adjusted according to a facial expression of said face in at least one previously captured facial image in said facial video sequence.

8. The method of claim 1, wherein said automatically identifying comprises automatically initiating said capturing in response to said alarming.

9. The method of claim 1, further comprising automatically adding a tag comprising content according to at least one schedule record of said schedule to said facial image.

10. The method of claim 1, further comprising automatically adding a tag describing a geographic location of said handheld device during said capturing to said facial image.

11. The method of claim 1, further comprising automatically adding a note created using said handheld device to said facial image.

12. The method of claim 1, wherein said adding comprises forwarding said facial image to a remote storage which hosts said facial video sequence and connected to a network.

13. The method of claim 12, further comprising presenting said facial video sequence to a plurality of users via said network.

14. A handheld device of creating a facial video sequence, comprising:
an image sensor which captures a sequence of images;
a scheduling module which sets at least one repetitive reminder in a schedule; and
a facial recognition module which activates said image sensor in response to said at least one repetitive reminder, automatically identifies a facial image depicting a face in a preset area in said sequence of images and automatically adds said captured facial image to a facial video sequence.

15. The handheld device of claim 14, further comprising a presentation unit which alarms a user according to said at least one repetitive reminder.

16. The handheld device of claim 14, further comprising an instruction module for computing at least one instruction for maneuvering said handheld device so capture said facial image and presenting said at least one instruction on a screen of said handheld device.

17. The handheld device of claim 14, wherein said handheld device is a cellular phone.

18. The handheld device of claim 14, further comprising a location module which detects a location of said handheld and adds said location to said facial image.

19. The handheld device of claim 14, further comprising a communication module for forwarding said facial image to a remote storage storing said facial video sequence.

20. The handheld device of claim 14, further comprising a memory of storing said facial image.

* * * * *